Patented Dec. 5, 1939

2,182,362

UNITED STATES PATENT OFFICE 2,182,362

POLYVINYL ACETAL RESIN SHEETS CONTAINING DI - (2 - ($\beta$ - ETHOXYETHOXY)-ETHYL-) FORMAL Henry B. Smith, Rochester, N. Y., assignor to Eastman Kodak Company, Rochester, N. Y., a corporation of New Jersey No Drawing. Application December 22, 1937, Serial No. 181,222

4 Claims. (Cl. 260—36)

This invention relates to plastic compositions, and more particularly to compositions comprising a polyvinyl acetal resin and a conditioning agent.

One object of this invention is to produce compositions of matter which may be made into permanently transparent, strong and flexible sheets or films of desired thinness which are substantially waterproof, are unaffected by ordinary photographic fluids and possess the desired properties of a support for sensitive photographic coatings. Another object of my invention is to produce compositions of matter which can be made into sheets suitable for use in laminated, shatter-proof glass. Still another object is to produce compositions which can be rolled, extruded, molded or otherwise worked into relatively thick sheets and massive plastics. A further object is to produce compositions suitable for use in lacquers, artificial silk filaments, wrapping tissues and the like. Other objects will hereinafter appear.

I have discovered that di-(2-($\beta$-ethoxyethoxy)-ethyl-) formal is a very useful conditioning agent for certain of the polyvinyl acetal resins, namely, the polyvinyl acetal resins in which a predominating proportion of the acetal groups are acetaldehyde acetal groups or butyraldehyde acetal groups. Not only does it serve as a plasticizer in the accepted sense of the term, increasing the flexibility and toughness of polyvinyl acetaldehyde or butyraldehyde acetal resin films, sheets, or other objects or masses containing it, but when used in amounts of about 40 or more parts per 100 parts of these resins, it has an unusual and remarkable effect which I may call "elasticizing". That is to say, a sheet of polyvinyl acetaldehyde or butyraldehyde acetal resin containing about 40 or more parts of di-(2-($\beta$-ethoxyethoxy)-ethyl-) formal per 100 parts of resin possesses the property which, in the rubber industry, is known as "nerve": namely, the property of stretching to a considerable extent when tension is exerted upon it, and returning to its original dimensions when the tension is released. This property renders such sheets, which I shall call "rubbery" sheets, particularly useful in the manufacture of shatter-proof glass.

Di-(2-($\beta$-ethoxyethoxy)-ethyl-) formal has the structural formula

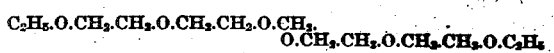

and can be prepared as follows:

600 g. of calcium chloride is dissolved in 1350 g. (10 gram-moles) of diethylene glycol monoethyl ether by heating to about 180° C. with stirring. The solution is cooled to about 100° C., and 300 g. (10 gram-moles of CH₂O) of trioxymethylene is added and well mixed in. The mixture is heated gradually with frequent shaking until refluxing starts. This occurs at about 140–145° C. Refluxing is continued for about 3 hours. The mixture is then allowed to cool to room temperature, and the top layer is decanted and distilled. The material coming over below 170° C. at normal pressure is discarded. The residue is distilled under reduced pressure, the material coming over below 165° C. at 7 mm. pressure being discarded. The di-(2-($\beta$-ethoxyethoxy)-ethyl-) formal distills at 165–235° C. at 7 mm. pressure.

For the manufacture of cast films or sheets, the polyvinyl acetal resin and di-(2-($\beta$-ethoxyethoxy)-ethyl-) formal may be dissolved in a suitable solvent or solvent mixture, such, for instance, as acetone, methanol, acetone-methanol mixtures, ethylene chloride-methanol mixtures, etc., about 300 to 500 or more parts of the solvent or solvent mixture being used per 100 parts of the resin. From about 2 to 100 parts or more of di-(2-($\beta$-ethoxyethoxy)-ethyl-) formal per 100 parts of resin may be employed, depending upon the nature of the resin and the purpose for which the sheets are to be used. Suitable proportions of di-(2-($\beta$-ethoxyethoxy)-ethyl-) formal for any resin and any purpose may be readily determined by experiment. For the manufacture of sheets suitable for photographic film base, from 2 to 25 parts of di-(2-($\beta$-ethoxyethoxy)-ethyl-) formal per 100 parts of resin are suitable. The resin solution is cast as a sheet, the solvent evaporated, and the sheet stripped from the casting surface.

Sheets for use in laminated glass may be formed by casting, or may be made without the use of volatile solvent by extrusion, for example in the manner set forth in application Serial No. 147,934 of John S. Kimble and Ernest C. Blackard, filed June 12, 1937. For instance, 40 or more parts of di-(2-($\beta$-ethoxyethoxy)-ethyl-) formal and 100 parts of a polyvinyl acetaldehyde or butyraldehyde acetal resin may be mixed in a suitable, jacketed mixer at a low temperature, for example 10° C., and the mixture may then be worked on hot rolls, in the manner described in U. S. Patent 2,048,686 of F. R. Conklin, until complete homogenization has taken place. The mass thus produced may then be extruded through an annular die, and the tube so formed slit to form a sheet.

The polyvinyl acetal resins can be prepared by reacting polyvinyl alcohol with an aldehyde in the presence of an acetal condensation catalyst, e. g. a mineral acid. These resins can also be prepared by simultaneously de-esterifying a polyvinyl aliphatic ester and reacting the de-esterification product with an aldehyde in the presence of a de-esterifying catalyst and acetal condensation catalyst. Mineral acids are catalysts for both de-esterification and acetal formation. The polyvinyl acetal resins with which di-(2-(β-ethoxyethoxy)-ethyl-) formal is useful include the polyvinyl acetaldehyde acetal resins, the polyvinyl butyraldehyde acetal resins, and the polyvinyl butyraldehyde acetaldehyde mixed acetal resins.

Examples of the preparation of polyvinyl acetaldehyde acetal resins may be found in U. S. Patent 2,044,730, Example 1; U. S. Patent 1,955,068, Example 2; U. S. Patent 2,036,092, Examples 4, 5 and 6; British Patent 466,598, Examples 1, 2, 3, 4 and 7; British Patent 404,279, Examples 1, 2, 4, 5, 6, 7 and 8; U. S. Patent 1,990,399; and French Patent 808,578, Examples 1, 2 and 3.

Additional examples of the preparation of polyvinyl acetaldehyde acetal resins are as follows:

100 lbs. of polyvinyl acetate, the viscosity of whose molar solution in benzene was 45 centipoises, was dissolved in 300 lbs. of 95% ethyl alcohol. To this solution were added 30 lbs. of paraldehyde and 25 lbs. of 35% HCl. The reaction mixture was allowed to stand for 4 days at 40° C., after which it was diluted with ethyl alcohol, and the resin precipitated by pouring into cold water, washed and dried. Analysis showed the resin to have an acetate group content equivalent to 2.1% by weight of polyvinyl acetate and a hydroxyl group content equivalent to 12.9% by weight of polyvinyl alcohol.

25 lbs. of polyvinyl acetate, the viscosity of whose molar solution in benzene was 45 centipoises, was dissolved in 75 lbs. of 95% ethyl alcohol. To this solution was added 8 lbs. of paraldehyde and a solution of 3 lbs. 12 ozs. of sulfuric acid in 3 lbs. 12 ozs. of 95% ethyl alcohol. The reaction mixture was allowed to stand for 7 days at 40° C., after which it was diluted with ethyl alcohol, and the resin precipitated by pouring into cold water, washed, and dried. Analysis showed the resin to have an acetate group content equivalent to 1.7% by weight of polyvinyl acetate and a hydroxyl group content equivalent to 13.8% by weight of polyvinyl alcohol.

Examples of the preparation of polyvinyl butyraldehyde acetal resins may be found in U. S. Patent 2,044,730, Examples 2, 5 and 6; British Patent 466,598, Example 5; French Patent 813,303, Example 1; French Patent 813,514, Examples 1, 2, 3 and 4; and British Patent 459,878, Examples 1, 2, 5, 6, 7, 8, 9 and 10.

An additional example of the preparation of a polyvinyl butyraldehyde acetal resin is as follows:

23.6 lbs. of polyvinyl acetate, the viscosity of whose molar solution in benzene was 45 centipoises, was dissolved in 56.5 lbs. of 95% ethyl alcohol. To this solution was added 7.9 lbs. of butyraldehyde and 5.9 lbs. of 35% HCl. The reaction mixture was allowed to stand for 4 days at 40° C., after which it was diluted with ethyl alcohol and acetic acid, and the resin precipitated by pouring into cold water, washed, and dried. Analysis showed the resin to have an acetate group content equivalent to 3.1% by weight of polyvinyl acetate and a hydroxyl group content equivalent to 16.3% by weight of polyvinyl alcohol.

An example of the preparation of a polyvinyl butyraldehyde acetaldehyde mixed acetal resin is given in French Patent 813,303, Example 2.

What I claim as my invention and desire to be secured by Letters Patent of the United States is:

1. A transparent, rubbery sheet comprising 100 parts of a polyvinyl acetal resin in which a predominating proportion of the acetal groups are selected from the group consisting of acetaldehyde acetal groups and butyraldehyde acetal groups, and at least 40 parts, approximately, of di-(2-(β-ethoxyethoxy)-ethyl-) formal as an elasticizer therefor.

2. A transparent, rubbery sheet comprising 100 parts of a polyvinyl acetaldehyde acetal resin and at least 40 parts, approximately, of di-(2-(β-ethoxyethoxy)-ethyl-) formal as an elasticizer therefor.

3. A transparent, rubbery sheet comprising 100 parts of a polyvinyl butyraldehyde acetal resin and at least 40 parts, approximately, of di-(2-(β-ethoxyethoxy)-ethyl-) formal as an elasticizer therefor.

4. A transparent, rubbery sheet comprising a polyvinyl acetal resin in which a predominating proportion of the acetal groups are selected from the group consisting of acetaldehyde acetal groups and butyraldehyde acetal groups, and an amount of di-(2-(β-ethoxyethoxy)-ethyl-) formal sufficient to impart to the sheet a rubbery character without substantially impairing its transparency.

HENRY B. SMITH.